United States Patent [19]

Mendelsohn et al.

[11] 4,360,445

[45] Nov. 23, 1982

[54] OXYGEN STABILIZED ZIRCONIUM-VANADIUM-IRON ALLOY

[75] Inventors: Marshall H. Mendelsohn, Woodridge; Dieter M. Gruen, Downers Grove, both of Ill.

[73] Assignee: The United States of America as represented by the United States Department of Energy, Washington, D.C.

[21] Appl. No.: 274,117

[22] Filed: Jun. 16, 1981

[51] Int. Cl.³ .......................... H01J 7/18; C22C 16/00
[52] U.S. Cl. ............................... 252/181.6; 75/123 H; 75/123 J; 420/417; 420/422
[58] Field of Search .................... 252/181.5, 181.6; 75/134 N, 134 F, 134 V, 134 M, 170, 175.5, 177

[56] References Cited

U.S. PATENT DOCUMENTS

| | | | |
|---|---|---|---|
| 3,203,901 | 8/1965 | della Porta | 252/181.6 |
| 3,922,872 | 12/1975 | Reilly et al. | 75/134 F |
| 4,071,335 | 1/1978 | Barosi | 55/68 |
| 4,153,484 | 5/1979 | Gamo et al. | 75/134 F |
| 4,163,666 | 8/1979 | Shaltiel et al. | 75/134 F |
| 4,312,669 | 1/1982 | Boffito et al. | 75/177 |

OTHER PUBLICATIONS

SAES 231/A, Non-Evaporable Ternary Gettering Alloy, Particularly for the Sorption of Water Vapor in Nuclear Reactor Fuel Elements, (Translation of German Patent No. 3,003,061).
SAES 231/B, Method for the Sorption of Water, Water Vapor and Other Gases, Utilizing a Non-Evaporable Ternary Gettering Alloy, (Translation of German Patent No. 3,003,114).
Boffito et al., "A Nonevaporable Low Temperature Activatable Getter Material", *J. Vac. Sci. Technology*, 18(3), Apr. 1981, pp. 1117-1120.

*Primary Examiner*—John Kight, III
*Assistant Examiner*—Nathan M. Nutter
*Attorney, Agent, or Firm*—James W. Weinberger; Walter L. Rees; Richard G. Besha

[57] ABSTRACT

An oxygen stabilized intermetallic compound having the formula $(Zr_{1-x}Ti_x)_{2-u}(V_{1-y}Fe_y)O_z$ where $x=0.0$ to 0.9, $y=0.01$ to 0.9, $z=0.25$ to 0.5 and $u=0$ to 1. The compound is capable of reversibly sorbing hydrogen at temperatures from $-196°$ C. to $200°$ C. at pressures down to $10^{-6}$ torr. The compound is suitable for use as a hydrogen getter in low pressure, high temperature applications such as magnetic confinement fusion devices.

4 Claims, 3 Drawing Figures

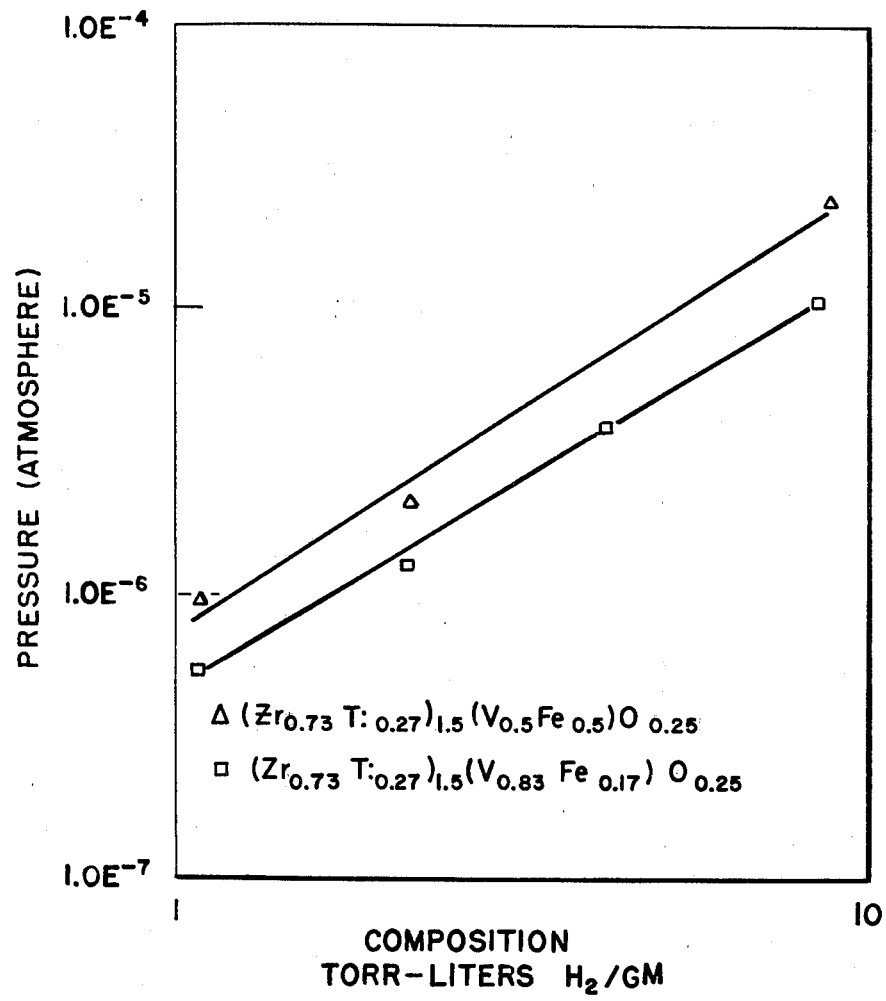

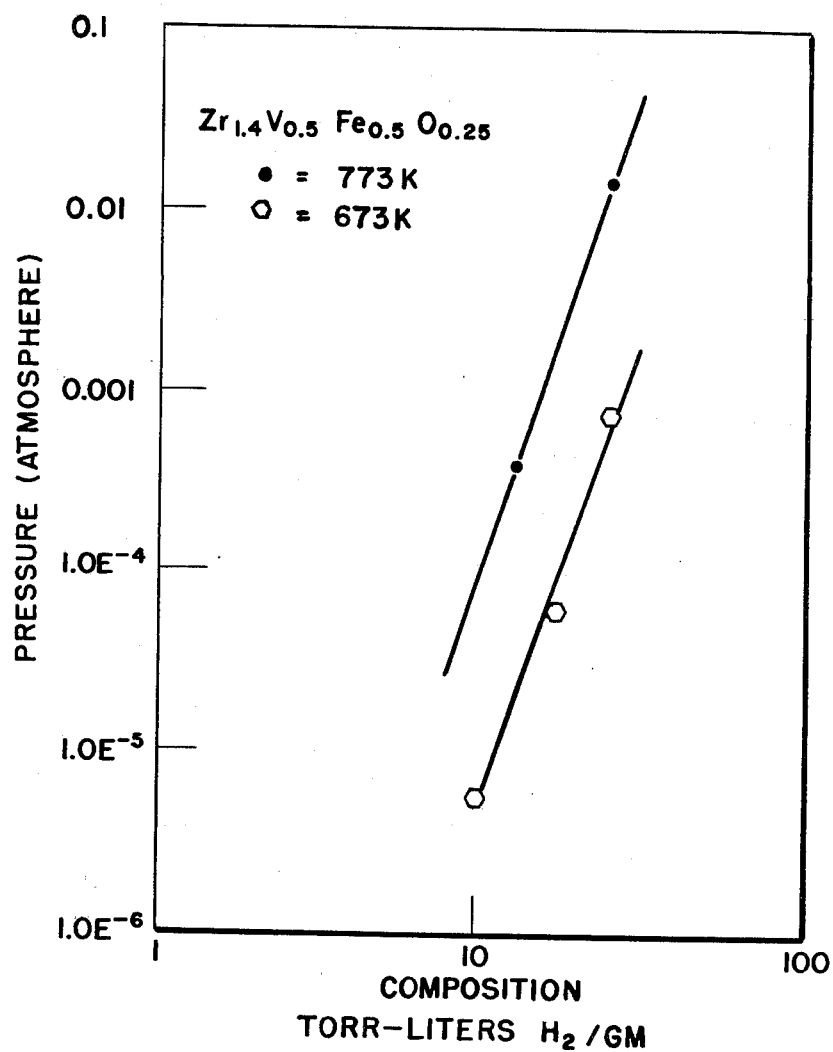

OXYGEN STABILIZED ZIRCONIUM-VANADIUM-IRON ALLOY

CONTRACTUAL ORIGIN OF THE INVENTION

The U.S. Government has rights in this invention pursuant to Contract No. W-31-109-ENG-38 between the U.S. Department of Energy and Argonne National Laboratory.

BACKGROUND OF THE INVENTION

This invention relates to an oxygen stabilized intermetallic compound capable of sorbing hydrogen and other gases. More specifically, this invention relates to an oxygen stabilized intermetallic compound capable of reversibly sorbing hydrogen and of gettering other gases such as CO, $N_2$ and $O_2$.

It is generally recognized that impurities in the plasma of magnetic confinement fusion devices such as Tokamaks can seriously limit the performance of such devices by lowering the plasma temperature and quenching the fusion reaction. These impurities are introduced into the plasma by a variety of sputtering and erosion processes occuring at the walls of the devices by hydrogen isotope recycling. These impurities may consist of the elements oxygen, carbon, hydrogen, including deuterium and tritium, and compounds of these elements. Some metal ions may also be present which have been sputtered from the walls of the device during operation.

Some solutions to the problem of impurity control include modifying the recycling processes, minimizing the erosion rates at the surfaces facing the plasma and removing the offending impurities from the plasma. It has been shown that the trapping and subsequent readmission of hydrogen isotopes from walls affects plasma profiles, especially at the edge, substantially modifying impurity influxes. In deuterium-tritium burning devices, wall recycling will strongly influence tritium inventory, which must be held to within well-defined limits. Therefore, tritium retention is an important factor in the design of a suitable fusion device.

There is need for materials which can be placed within a magnetic containment fusion device to getter hydrogen and hydrogen isotopes under the low pressure, high temperature conditions which are present within such device. The material must be reasonably selective for hydrogen and must be able to function as a hydrogen and hydrogen isotope getter at pressures down to at least $10^{-6}$ torr, in the presence of power fluxes up to about 50 w/cm$^2$ and at temperatures varying from room temperature up to about 200° C. The material should have a high hydrogen capacity to reduce the frequency of regeneration, it should be able to be regenerated with respect to absorbed hydrogen at a relatively low temperature, preferably no higher than 500° C., and it must function as a hydrogen getter in the presence of other contaminant gases. Preferably, the material would getter other gases present in the plasma as as contaminants, such as $N_2$, $O_2$ and CO, although it need not be regenerable with respect to these gases. The material must be able to be placed within the device either as a coating on a substrate or applied directly to the walls.

One material which has been used successfully for this purpose is sublimed titanium. However, titanium is not easily regenerated so that fresh layers must be applied to the surface for each gettering cycle. Another material which fulfills many of the requirements is ST101. This material is a proprietary Zr-Al based alloy available from SAES Getters of Milan, Italy. The Zr-Al alloys have limited hydrogen capacities and regeneration of the alloy within a reasonable time period requires that it be heated to temperatures of at least 750° C. A zirconium-vanadium-chromium alloy which meets many of these requirements is disclosed in an U.S. patent application Ser. No. 196,710, filed Oct. 14, 1980 and assigned to the common assignee.

SUMMARY OF THE INVENTION

It has been found that the addition of a small amount of oxygen to an alloy of zirconium, vanadium and iron will form a new oxygen stabilized intermetallic compound in which the Zr:V ratio may vary from 1:1 to 2:1. The new compound has the Ti$_2$Ni cubic Fd3m structure and is capable of reversibly sorbing hydrogen at temperatures down to $-196°$ C. and at pressures as low as $10^{-6}$ torr. Furthermore, it has been found that the addition of titanium makes it possible to control the gettering and regeneration conditions of the compound.

The intermetallic compound of the invention has the formula $(Zr_{1-x}Ti_x)_{2-u}(V_{1-y}Fe_y)O_z$ where $x=0$ to 0.9, $y=0.01$ to 0.9, $z=0.25$ to 0.5, and $u=0$ to 1.

The new compound has a greater hydrogen capacity and a higher gettering rate for hydrogen than known prior art compounds. Furthermore, the compound has a greater capacity and higher gettering rate for poisons such as CO, $N_2$ and $O_2$.

It is therefore an object of the invention to provide an alloy suitable for gettering hydrogen and other gases.

It is another object of the invention to provide an alloy which can reversibly sorb hydrogen.

It is another object of the invention to provide an alloy suitable for gettering hydrogen within a fusion plasma type reactor.

It is still another object of the invention to provide an alloy for gettering hydrogen at temperatures from $-196°$ C. to 200° C. and at pressures down to $10^{-6}$ torr.

It is a further object of the invention to provide an alloy for gettering hydrogen which can also getter large quantities of CO and other contaminant gases present in fusion plasma type reactors.

Finally, it is the object of the invention to provide an alloy capable of gettering hydrogen in which the gettering and regeneration conditions can be controlled.

BRIEF DESCRIPTION OF THE DRAWINGS

FIG. 2 contains several curves taken at 400° C. which show the effect of changing the V:Fe ratio while keeping the Zr:Ti ratio constant.

FIG. 3 shows the effect of increasing temperature on the alloy $Zr_{1.4}V_{0.5}Fe_{0.5}O_{0.25}$.

BRIEF DESCRIPTION OF THE PREFERRED EMBODIMENT

Figure 1:
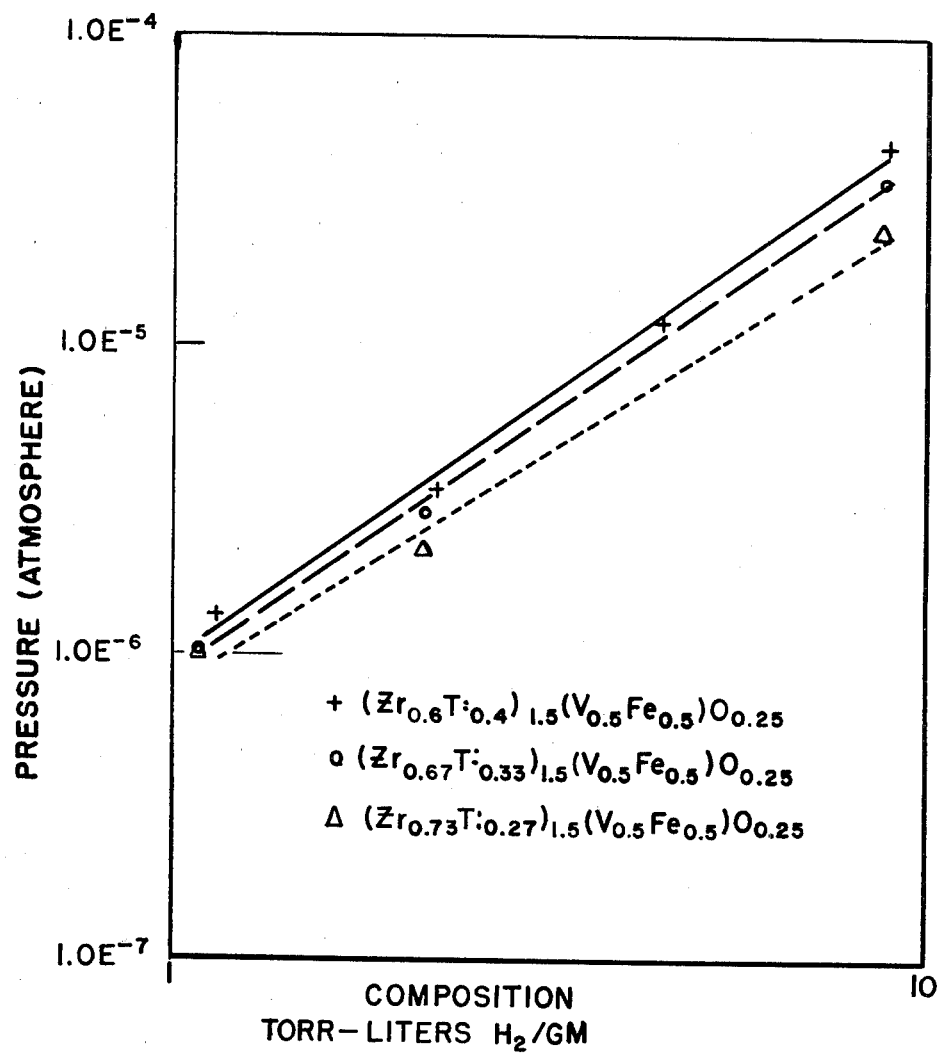
FIG. 1 contains several curves taken at 400° C. which show the effect of changing the Zr:Ti ratio while keeping the Fe content constant.

The oxygen stabilized intermetallic compound of the invention has the formula $(Zr_{1-x}Ti_x)_{2-u}(V_{1-y}Fe_y)O_z$ where $x=0.0$ to 0.9, $y=0.01$ to 0.9, $z=0.25$–0.5 and $u=0$ to 1. The compound is prepared by melting together appropriate quantities of high purity powders of zirconium, titanium, vanadium and iron, in a furnace under an inert atmosphere to form the compound. The oxygen is added by using a powdered metal-oxide in place of a metal when preparing the melt. Preferably, the mixture is melted several times in order to ensure complete homogeneity of the alloy.

The homogenized intermetallic compound must be activated before it can be successfully used as a getter. This is accomplished by contacting the compound with hydrogen gas at a pressure at least above the decomposition pressure of the compound, generally at least one or two atmospheres, for a period of time sufficient to hydride the compounds, generally ½ to 2 hours. It may be preferred to granulate the material to ¼ to ½ inch or smaller particles to ensure complete activation.

The compound is $Ti_2Ni$ type cubic Fd3m structure where the lattice parameter a=11.3 Å to about 12.2 Å.

The compound must contain from about 7 to about 14 atom percent (z=0.25 to 0.5) oxygen in order to stabilize the zirconium and vanadium into the $Ti_2Ni$ cubic structure which is capable of gettering hydrogen. Quantities of oxygen less than about 7 atom percent or greater than about 14 atom percent will result in the formation of phase structures which are not suitable for gettering hydrogen. Because of the broad homogeneity range of these compounds, the zirconium to vanadium ratio may vary from 1:1 to 2:1. An increase in vanadium serves to increase the rate at which hydrogen, and also carbon monoxide will be gettered. The compound may contain from 0.01 to 0.9 mole, preferably about 0.5 mol vanadium.

The oxygen stabilized zirconium-vanadium-iron alloy forms a very stable hydride and requires high temperatures for regeneration to remove the hydrogen. The stability of the compound can be decreased and the regeneration temperatures lowered by the addition of titanium. Titanium may be substituted for zirconium in an amount up to about 0.9 mol. depending upon the desired regeneration temperature which, at a given pressure may vary from about 200° to about 700° C.

The iron is necessary to maintain the stability, of the compound, and also to make the alloy more friable. The iron increases the brittleness to permit fracturing and powdering the alloy. While iron is the preferred metal for this purpose, a number of other metallic elements such as nickel, cobalt, copper or manganese are also suitable. The compound may contain from about 0.01 to 0.9, preferably 0.5 mol of these metals.

The following Examples are given as illustrative of the intermetallic compound of the invention and are not to be taken as limiting the scope of the invention which is defined by the appended claims:

EXAMPLE I 2.5542 gm of Zr metal powder, 0.4075 gm of V metal powder, 0.5585 gm of Fe metal powder and 0.1819 gm of $V_2O_5$ powder were mixed together and compressed into a pellet using a ⅜ inch diameter die and a hydraulic pellet press. The pellet was then placed in an arc-melting furnace. The furnace was evacuated and filled with Ar gas. The pellet was then melted and remelted with a weight loss of 0.2%. As determined by x-ray diffraction the compound formed was $Zr_{1.4}V_{0.5}Fe_{0.5}O_{0.25}$.

EXAMPLE II 1.0034 gm of Zr metal powder, 0.4249 gm of V metal powder, 0.1916 gm of Ti metal powder, and 0.1326 gm of $Fe_2O_3$ powder were mixed together and compressed into a pellet. The pellet was then melted and remelted with a 180 weight gain of 0.4%. The compound formula as determined by x-ray diffraction was $(Zr_{0.73}Ti_{0.27})_{1.5}(V_{0.83}Fe_{0.17})O_{0.25}$.

EXAMPLE III 0.3585 gm of the alloy of Example I was weighed out and placed in a quartz tube container. The alloy was "activated" by first evacuating the reactor tube and exposing the sample to 32.9 PSIA of $H_2$ gas. After absorbing 42.8 Torr-liters of $H_2$, the hydrogen was removed by heating the sample to about 750° C. and pumping out the hydrogen gas. A furnace was placed around the quartz tube and the alloy was thereby heated to 500° C. 11.6 torr-liters of CO was then measured out and exposed to the alloy. After a few minutes, the absorption had stopped, leaving about 1.4 torr-liters of CO unabsorbed. The total CO absorption, therefore, was about 10.2 Torr-liters of CO or about 28.5 torr-liters/gm alloy. This is about 15 times the CO sorption capacity of prior art Zr-Al alloys.

EXAMPLE IV 0.5022 gm of the alloy of Example II was weighed out and placed in a quartz tube reactor. The alloy was "activated" by first evacuating the reactor tube and exposing the sample to 32.7 PSIA of hydrogen gas. After absorbing 75.0 torr-liters of hydrogen, the sample was heated to ~750° C. and the hydrogen gas removed by pumping. The sample was cooled to 400° C. and maintained at 400° with a temperature-controlled furnace. The sample was exposed to 0.047 torr-liters of CO gas at a pressure of 0.85 torr. The pressure vs. time behavior of the system was recorded with a strip chart recorder. The data were evaluated using standard first-order kinetics. The alloy was calculated to have a rate constant of 0.093 $sec^{-1}$ for CO.

EXAMPLE V 0.3585 gm of the alloy of Example I was and placed in a quartz tube container. The alloy was "activated" as described herein before. A dewar containing liquid $N_2$ was placed around the quartz tube and the alloy was cooled to ~ -196° C. 24.4 torr-liters of $H_2$ was then measured out and exposed to the alloy. After a few minutes, the absorption had stopped, leaving about 2.2 torr-liters of $H_2$ unabsorbed. The total $H_2$ absorption at -196° C., therefore was about 22.2 torr-liters of $H_2$ or about 61.9 torr-liters/gm alloy.

EXAMPLE VI 0.6842 gm of the same alloy was weighed out and placed in a quartz tube reactor. The alloy was "activated" by contact with hydrogen gas. The activated sample was heated and maintained at 50° C. in a constant temperature bath. The sample was then exposed to 0.45 torr-liters of hydrogen gas at a pressure of 6.3 torr. The pressure vs. time behavior of the system was recorded on a strip chart recorder. The data were then evaluated using standard first-order kinetics and a rate 230 constant of about 0.44 $sec^{-1}$ was obtained.

The rate constants of $H_2$ absorption for an alloy which did not contain Ti was determined for several temperatures in the same manner. The results are given in Table I below:

TABLE I

| Rate Constants for $H_2$ Absorption | °Temperature (°C.) |
|---|---|
| by $Zr_{1.4}V_{0.5}Fe_{0.5}O_{0.25}$ | |
| 0.43 $sec^{-1}$ | 50° |

TABLE I-continued

| Rate Constants for H$_2$ Absorption | Temperature (°C.) |
|---|---|
| 0.42 sec$^{-1}$ | 0° |
| 0.41 sec$^{-1}$ | −78° |
| 0.39 sec$^{-1}$ | −196° |

EXAMPLE VII

The hydrogen gettering rate for the alloy of Example VI was compared with the gettering rate for a Zr-Alloy at three different temperatures. The results are given in Table 2 below:

TABLE II

Rate Constants for Hydrogen Absorption (Sec$^{-1}$)

| Temp. (°C.) | Zr$_{1.4}$V$_{0.5}$Fe$_{0.5}$O$_{0.25}$ | Zr-Al alloy | Comments |
|---|---|---|---|
| 0° | 0.42 | 0.0547 | 8 times faster than Zr-Al alloy |
| 50° | 0.43 | 0.102 | 4 times faster than Zr-Al alloy |
| 163° | | 0.292 | |

EXAMPLE VIII

Several compounds having varying Zr:Ti ratios were prepared as hereinbefore described. The compounds were activated with hydrogen. The hydrogen was then removed by heating the sample to ∼750° and pumping out the hydrogen. The sample was cooled and maintained at 400° C. A known amount of hydrogen gas was added to the sample and allowed to equilibrate. The hydrogen pressure was measured at equilibrium and then an additional amount of hydrogen was added. This procedure could be repeated as many times as desired.

EXAMPLE IX

In the same manner, several more compounds were prepared in which the V:Fe ratio was varied while keeping the Zr:ti ratio constant. The compounds were then heated to 400° C. as described in Example VIII. The results are given in FIG. 2.

EXAMPLE X

A compound having the formula Zr$_{1.4}$V$_{0.5}$Fe$_{0.5}$O$_{0.25}$ was fully dehydrided and then heated to determine the effect of temperature on the compound. The results are shown in FIG. 3.

The embodiments of the invention in which an exclusive property or privilege is claimed are defined as follows:

1. An oxygen stabilized intermetallic compound capable of reversibly sorbing hydrogen having the chemical formula $(Zr_{1-x}Ti_x)_{2-u}(V_{1-y}M_y)O_z$ where x=0 to 0.9, y=0.01 to 0.9, z=0.25 to 0.5, u=0 to 1 and M is selected from the group consisting of iron, nickel, cobalt and manganese.

2. The oxygen stabilized compound of claim I wherein M is iron.

3. A method of gettering hydrogen from a low pressure environment comprising contacting the hydrogen with an oxygen stabilized compound having the formula $(Zr_{1-x}Ti_x)_{2-u}(V_{1-y}M_y)O_z$, where x=0 to 0.9, y=0.01 to 0.9, z=0.25 to 0.5, u=0 to 1 and M is selected from the group consisting of iron, nickel, cobalt and manganese.

4. The method of claim 3 wherein the pressure is at least 10$^{-6}$ torr and the temperature is from −196° C. to 200° C., and M is iron.

* * * * *